US005958365A

United States Patent [19]

Liu

[11] Patent Number: 5,958,365
[45] Date of Patent: Sep. 28, 1999

[54] METHOD OF PRODUCING HYDROGEN FROM HEAVY CRUDE OIL USING SOLVENT DEASPHALTING AND PARTIAL OXIDATION METHODS

[75] Inventor: Stephen K. Liu, Bellingham, Wash.

[73] Assignee: Atlantic Richfield Company, Los Angeles, Calif.

[21] Appl. No.: 09/104,511

[22] Filed: Jun. 25, 1998

[51] Int. Cl.$^6$ ............................... C01B 3/12; C10C 3/00; C07C 1/02; E03B 3/11

[52] U.S. Cl. ............................. 423/655; 208/86; 208/92; 208/226; 208/41; 252/373; 166/50; 166/267

[58] Field of Search ............................ 423/655; 208/226, 208/86, 92; 252/373; 166/50, 267

[56] References Cited

U.S. PATENT DOCUMENTS

| | | |
|---|---|---|
| 1,655,603 | 1/1928 | Hanna . |
| 1,666,597 | 4/1928 | Harnsberger . |
| 1,727,380 | 9/1929 | Ryder . |
| 4,218,287 | 8/1980 | Albright et al. ............................ 201/9 |
| 4,226,830 | 10/1980 | Davis ....................................... 422/143 |
| 4,309,198 | 1/1982 | Moss ..................................... 48/197 R |
| 4,388,877 | 6/1983 | Molayem et al. ...................... 110/342 |
| 4,407,367 | 10/1983 | Kydd ....................................... 166/267 |
| 4,420,008 | 12/1983 | Shu ............................................. 137/4 |
| 4,531,586 | 7/1985 | McMillen ............................ 166/305 R |
| 4,570,656 | 2/1986 | Matlach et al. ............................ 137/13 |
| 4,844,158 | 7/1989 | Jennings, Jr. ............................ 166/267 |
| 5,015,356 | 5/1991 | Talbert ....................................... 208/16 |
| 5,355,958 | 10/1994 | Pauls et al. ............................... 166/307 |
| 5,406,786 | 4/1995 | Scharpf et al. ......................... 60/39.05 |
| 5,671,810 | 9/1997 | Hodge et al. ............................ 166/301 |
| 5,795,445 | 8/1998 | Boswell et al. ............................ 201/39 |

FOREIGN PATENT DOCUMENTS

| | | | |
|---|---|---|---|
| 1238598 | 6/1988 | Canada ................................... | 196/83 |

OTHER PUBLICATIONS

"FW Solvent Deasphalting" by F.M. Van Tine and Howard M. Feintuch, "Handbook of Petroleum Refining Processes", 2nd Ed., by Robert A. Meyers, Chapter 10.2; McGraw Hill, 1997.

Design Considerations for Utility Size CFB Steam Generators, James E. Maitland, Richards S. Skowyra, Bruce W. Wilhelm., Power–Gen'94, Dec. 7–9–1994 7th International Conference & Exhibition for the Power Generating Industries, Book III, pp. 45–47.

Using Low Cost Petroleum Coke to Produce Electricity: Jack L. Cotton, Jr. Sales Manager, Pyropower Corporation, Power–Gen'94, Dec. 7–9–1994 7th International Conference & Exhibition for the Power Generating Industries, Book III, pp. 72–92.

Six Years of ABB–CE, Petcoke and Fluid Beds: Mike Tanca, Senior Consulting Fluidized Bed Engineer, Combustion Engineering Inc. Power–Gen'94, Dec. 7–9–1994 7th International Conference & Exhibition for the Power Generating Industries, Book III, pp. 94–116.

Combustion Fossil Power Systems, A Reference Book on Fuel Burning and Steam Generation: Joseph G. Singer, 1981, chapter 24, pp. 19–28.

"Air Partial Oxidation" by Surinder M. Marria, Chief Process Engineer, Foster Wheeler USA Corporation, Clinton New Jersey; for Presentation at the Foster Wheeler Hydrogen Plant Conference, Orlando, Florida, Jun. 1992.

*Primary Examiner*—Paul J. Killos
*Assistant Examiner*—J. Parsa
*Attorney, Agent, or Firm*—F. Lindsey Scott

[57] ABSTRACT

Heavy crude oil is recovered and processed at a refinery through (a) a distillation zone(s), (b) a solvent deasphalting unit (c ) a high pressure air partial oxidation gasifier to produce a CO-rich gas mixture including hydrogen, (d) a shift reactor and (e) a purification step to produce 99.9% pure hydrogen. The hydrogen is used to treat a deasphalted oil fraction and distillate hydrocarbon fractions obtained from the crude oil. The process is considered integrated in the sense that the purified hydrogen recovered from the heavy crude oil is used to treat hydrocarbons recovered from the same crude oil.

18 Claims, 2 Drawing Sheets

METHOD OF PRODUCING HYDROGEN FROM HEAVY CRUDE OIL USING SOLVENT DEASPHALTING AND PARTIAL OXIDATION METHODS

BACKGROUND OF THE INVENTION

1. Field of the Invention

This invention relates to a method of producing hydrogen for use in a refinery processing heavy crude oil. In one aspect, the invention relates to a method of producing hydrogen by processing the bottoms of a solvent deasphalting process into hydrogen using partial oxidation methods. In another aspect, the invention relates to an integrated system for producing hydrogen from the bottoms of a solvent desasphalting system in a refinery and using the $H_2$ in the hydroprocessing operations of the refinery.

2. Description of Related Art

Heavy crude oil is generally produced in remote locations, making it impractical to refine the oil at those locations. In such instances, the heavy crude oil is generally transported to a refinery where the crude oil is refined into useful products such as naphtha, kerosene, diesel fuel, fuel oils, gasoline, lube oil, and the like. ("Heavy crude oil" is defined as an oil having an API gravity of about 6 to about 20 API and a high asphaltene content.)

There is a need for large amounts of cheap hydrogen in the refining of heavy crudes. These crudes generally contain large amounts of sulfur, and must be desulfurized which is generally done by hydrogen treatments. The primary product of heavy crude is gas oil which requires significant hydrotreating or hydroprocessing which also uses large amounts of hydrogen. Other refinery operations that use hydrogen are treatments to remove nitrogen, oxygen compounds and to saturate olefins. Moreover, the hydrocracking of the large molecules in the heavy oil requires large amounts of hydrogen.

U.S. patent application Ser. No. 08/927,427, filed Sep. 11, 1997, and entitled "Method for Transporting a Heavy Crude Oil Produced via a Wellbore from a Subterranean Formation to a Market Location and Converting it into a Distillate Product Stream Using a Solvent Deasphalting Process" discloses a method for treating heavy crude where deasphalted heavy crude bottoms are used as a fuel to generate steam in a boiler like reactor for use in the crude distillation and deasphalting operations and for generating of electricity. The flue gas from the fuel combustion is further treated in a water shift reactor to produce hydrogen for use in refining operation such as hydrogenation. However this process produces relatively small amounts of hydrogen because the flue gas contains only small amounts of CO which is the reactant in the water shift reaction to produce the $H_2$.

SUMMARY OF THE INVENTION

The method of the present invention, in one aspect, involves an integrated system for producing hydrogen from heavy crude oil and using the hydrogen so produced in the treatment of distillation products of the heavy crude.

The process comprises five basic steps: (1) distilling a heavy crude oil by atmospheric or vacuum distillation into at least one overhead light hydrocarbon stream and a heavier bottom stream, (2) deasphalting the bottoms stream by solvent deasphalting to produce a deasphalted oil stream and an asphaltic residue stream, (3) partially oxidizing the asphaltic residue steam in a high pressure, high temperature gasifier, preferably an air partial oxidation gasifier, to produce a CO-rich synthesis gas stream, (4) generating and purifying hydrogen from the CO-rich synthesis gas stream, and (5) treating a hydrocarbon stream, preferably the deasphalted oil stream with the hydrogen.

The process of the present invention has particular application in the processing of heavy crude oil because (a) heavy crude oil yields a large amount of low value bitumen which can be used to produce hydrogen, and (b) there is a need for large amounts of hydrogen for treating the heavy oil. The process, in a preferred embodiment, is thus an integrated system for generating hydrogen from a heavy crude and using the hydrogen so generated in the treatment of products from the same crude.

DESCRIPTION OF THE PREFERRED EMBODIMENT

In the discussion of the Figures the same numbers will be used throughout to refer to the same or similar components. Pumps, valves and the like necessary to achieve the described process flows and the like are considered to be well known to the art and have not been shown.

Heavy Oil Producing Well

Figure 1:
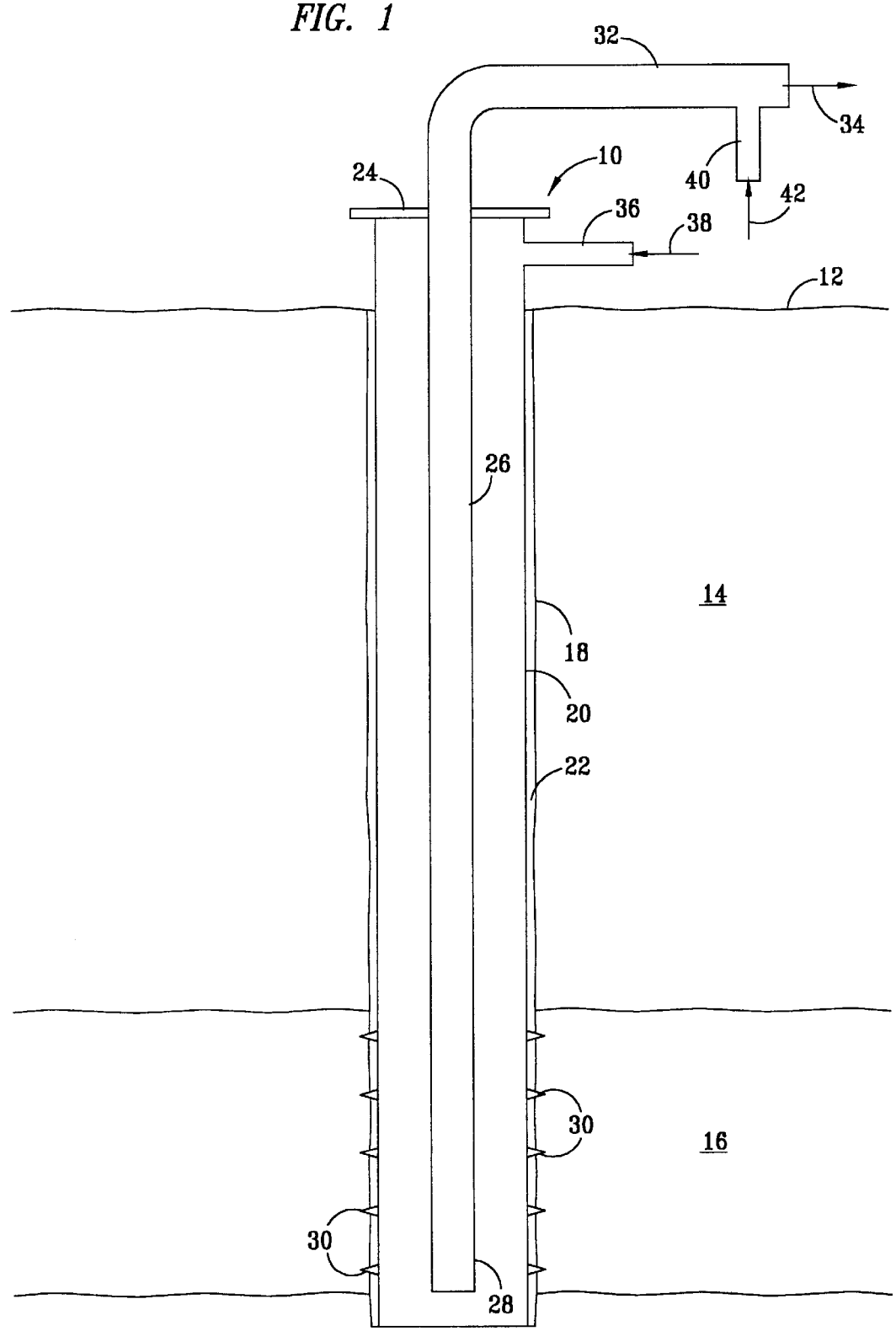
FIG. 1 is a schematic diagram of an oil well penetrating a heavy crude oil-bearing subterranean formation for the production of a heavy crude oil.

In FIG. 1 a well 10 is shown extending from a surface 12 through an overburden 14 and penetrating an oil-bearing formation 16. Well 10 comprises a wellbore 18 which includes a casing 20 which is cemented in place with cement 22 through formation 16. Well 10 also includes a well head 24 positioned on casing 20 as known to those skilled in the art for the injection of fluids and the production of fluids from well 10. Well 10 also includes a tubing 26 positioned in casing 20 and extending into formation 16 to a depth sufficient for the production of heavy crude oil from formation 16. The heavy crude oil flows into a lower end 28 of tubing 26 and upwardly through wellbore 10 either under formation pressure or with pumping.

Casing 20 includes perforations 30 penetrating formation 16 so that fluid communication is accomplished between formation 16 and the inside of casing 20. Heavy crude oil recovered through tubing 26 flows upwardly and as shown schematically, flows through tubing 26 into a pipeline 32 for transportation to a refinery. Transportation may also include shipment by tanker.

If necessary a diluent may be injected into casing 20 through a line 36 as shown by an arrow 38 and flows downwardly to admixture with the heavy crude oil recovered through tubing 26. Alternatively, a diluent may be mixed with the heavy crude oil in pipeline 32 by adding the diluent to pipeline 32 via a line 40 as shown by an arrow 42. A variety of techniques can be used for admixing the diluent with either the heavy crude oil in pipeline 32 or the heavy crude oil in well 10. For instance a second tubing (not shown) could be run to the bottom of well 10 for the injection of diluent or diluent could be added to the heavy crude oil at any point along the length of tubing 26. Such variations are considered to be well known to those skilled in the art and have not been shown. The use of wells such as well 10 for the recovery of heavy crude oils from subterranean formations is considered to be well known to those skilled in the art.

The diluent may be a distillate hydrocarbon diluent which may be produced in a crude oil distillation unit or a vacuum flasher or by a combination of distillable hydrocarbons from a crude oil distillation unit and a vacuum flasher. Any suitable miscible material may be used as a diluent. The diluent is selected based upon the requirements for diluent properties, the value of the material used as a diluent and the like.

Distillation Units

Figure 2:
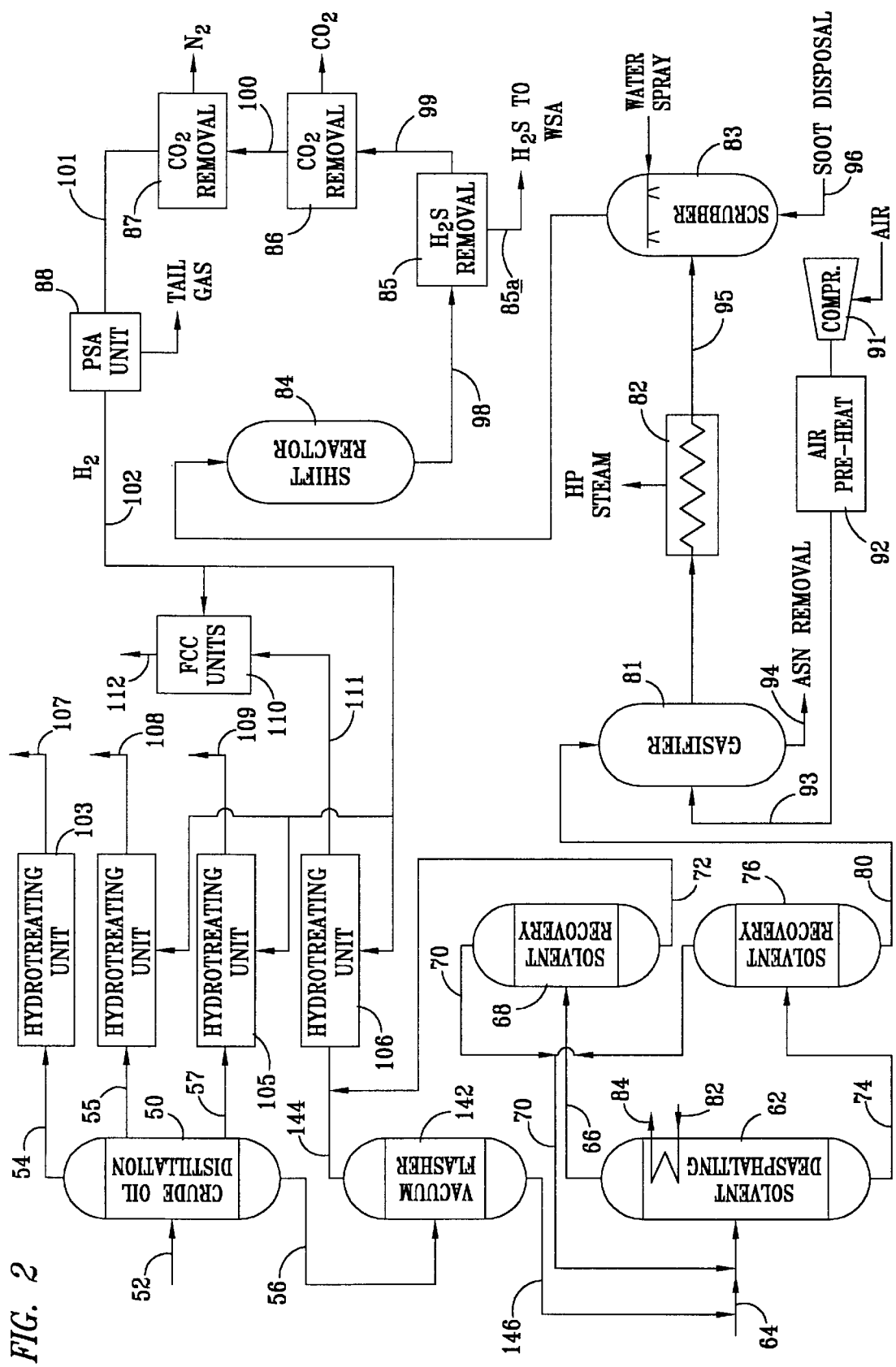
FIG. 2 is a schematic diagram of the preferred embodiment of the process of the present invention illustrating the process steps of atmospheric and vacuum distillation, solvent deasphalting, gasification, purification, and hydrogen treating.

In FIG. 2 a crude oil distillation unit 50 is shown at a refinery. A heavy crude oil (generally as a crude oil/diluent mixture) piped or transported to the refinery is charged to crude oil distillation unit 50 through a line 52 and distilled in unit 50 to produce a distillate hydrocarbon stream (e.g. naphtha) recovered through a line 54 and a bottom stream recovered through a line 56. The crude oil may also be used in a heater (not shown) to supply heat to unit 50 in a manner well known in the art. Also recovered in unit 50 are middle distillate products through lines 55 and 57.

The distillation in unit 50 typically separates distillable hydrocarbon materials which are readily separable from the crude oil at atmospheric pressure from the heavier portions of the crude oil. The distillation end point is a function of the crude oil feed to unit 50 and a variety of other factors known to those skilled in the art. Typically, the materials recovered as distillates have boiling ranges below about 710 to about 770° F. at atmospheric pressure. Such materials include light hydrocarbons and distillate products such as naphtha, stove oil, medium distillates such as kerosene, diesel, gas oil and the like.

The bottoms stream in line 56 is passed to a vacuum flasher 142. In vacuum flasher 142 the heavy hydrocarbonaceous stream recovered through line 56 is distilled under a relatively high vacuum, i.e. typically from about 2 to 4 inches of water, with additional distillate material (e.g. gasoil) being recovered overhead through line 144. The distillate material recovered through line 144 typically has a boiling range between about 750° F. to about 1060° F. at the reduced pressure in vacuum flasher 142. Such materials are generally referred to as heavy gas oils or vacuum gasoil and are suitably fed to further refining in a unit such as a fluidized catalytic cracking unit, a fixed bed hydrocracking unit or the like. The heat required in the vacuum flasher 142 may be supplied by a heater fueled by the heavy crude oil or other energy source available at the refinery. The heavy residual hydrocarbonaceous stream having a boiling point above about 750° F. to about 1060° F. recovered from vacuum flasher 142 via a line 146 is a stream which is frequently used as asphalt, fed to a delayed petroleum coker to produce petroleum coke, blended with a heavy distillate hydrocarbon stream and marketed as a heavy fuel or the like. This stream still contains valuable distillable hydrocarbon materials which are not separated by vacuum distillation. These materials are, however, readily recovered by a solvent deasphalting process. Accordingly, the heavy hydrocarbonaceous residue resulting from the vacuum distillation operation is passed through a line 146 to solvent deasphalting unit 62.

Deasphalting Unit

The bottoms stream recovered from vacuum flasher 142 through line 146 is passed to a solvent deasphalting unit 62. The bottoms stream in line 146 is mixed with a suitable solvent from line 64. The solvent is typically a paraffinic hydrocarbon solvent comprising paraffins containing from about 3 to about 7 carbon atoms. The use of such processes is well known to those skilled in the art as shown, for instance, in "Handbook of Petroleum Refining Processes", Robert A. Meyers, Editor in Chief, McGraw Hill, 1997, Chapter 10.2 "FW Solvent Deasphalting" by F. M. Van Tine and Howard M. Feintuch. Solvent deasphalting processes are typically used as an extension of vacuum distillation. The recovery of distillable hydrocarbons from heavy hydrocarbonaceous streams by vacuum distillation is dependent upon a boiling point distillation of the distillable hydrocarbon materials. The recovery of distillable hydrocarbons having a boiling point above about 1060° F. at atmospheric pressure by vacuum distillation requires distillation at temperatures at which thermal cracking reactions occur at a speed which makes such distillation separations impractical. As a result, solvent deasphalting is used with such streams.

While solvent deasphalting is typically used after a vacuum distillation step as illustrated in FIG. 2, solvent deasphalting can also be used with the bottoms streams from an atmospheric pressure crude oil distillation. The separation of distillable hydrocarbons is accomplished by differences in solvent solubility rather than by temperature distillation. This separation results in the recovery of the more soluble materials from the heavy hydrocarbon stream and produces a distillable stream which is generally somewhat less reactive than the stream from a vacuum distillation unit since it does not contain the olefins and other reactive materials which result from cracking and which are frequently found in vacuum distillation residues.

Solvent deasphalting unit 62 is any suitable countercurrent liquid/liquid contacting vessel. This vessel may be a stirred vessel with a plurality of plates, a packed column or the like. Since the solubility of the heavy oils in the paraffinic solvent is reduced by increasing the temperature (i.e., decreasing the density) of the paraffinic solvent, the temperature may be increased in the upper portion of solvent deasphalting unit 62 for reflux generation and the like. The temperature may be increased by charging steam to deasphalting unit 62 through a line 82, as shown, with spent steam being recovered through a line 84 and passed to further heat exchange, recovery as spent steam and the like. In such processes, a significant part of the process relates to the recovery of the solvent used for the separation of the deasphalted oil and the asphalt and asphaltene compounds. A variety of techniques have been used for this solvent recovery varying from distillation to super-critical separation. The super-critical separation processes generally heat the paraffinic solvent to a temperature such that its ability to dissolve the deasphalted oil or the asphalt and asphaltene compounds (asphaltic residue) is reduced to the point that a relatively pure solvent can be recovered by liquid/liquid separation. Such recovery systems are well known to those skilled in the art as discussed in the "Handbook of Petroleum Refining Processes". In FIG. 2, the overhead stream in line 66 which contains paraffinic solvent and deasphalted oil is passed to a solvent recovery process 68. Solvent recovery process 68 has been shown schematically and should be understood to include a plurality of vessels as required to accomplish the desired separation in the process selected for the separation. The purified solvent is recovered through a line 70 and passed to combination with the paraffinic solvent charged to solvent deasphalting unit 62 through line 64. The deasphalted oil is recovered and passed via line 72 to combination with the distillate hydrocarbon stream from vacuum flasher 142 in line 144. A bottoms stream is recovered from solvent deasphalting unit 62 which contains asphalt, asphaltenes and other heavy residual compounds (herein referred to as "asphaltic residue") and fed to a solvent recovery process 76 via line 74 where the paraffinic solvent is separated and recovered through a line 78 and passed back to combination with the paraffinic solvent in line 70 with an asphaltic residue being recovered through a line 80. It should be understood that solvent recovery section 76 may also comprise a plurality of vessels as required to accomplish the desired separation as known to those skilled in the art. The asphaltic residue is passed to gasifier 81 or a hydrogen production system.

Hydrogen Production System

The hydrogen production system comprises (a) a partial oxidation gas generator 81, (b) a heat recovery steam generator 82 (optional), (c) a scrubber 83, (d) a CO shift reactor 84, (e) $H_2S$, $CO_2$ and $N_2$ removal units 85, 86 and 87 and (f) a pressure swing adsorption unit 88.

This process for producing hydrogen is based on the well known pressure partial oxidation process and is particularly adapted to the production of hydrogen from heavy crude oil. A variation of the process, developed by Foster Wheeler USA Corp., is described in a paper entitled "Air Partial Oxidation", presented at the Foster Wheeler Hydrogen Plant Conference in Orlando, Fla. during June 1992, the disclosure of which is incorporated herein by reference. The use of air instead of $O_2$ in the partial oxidation offers cost and safety advantages, and accordingly is the preferred medium for use in the gas generator 81. The preferred pressure partial oxidation process is a non-catalytic process.

The partial oxidation gasifier 81 is a substantially empty refractory lined vessel equipped with a special burner for promoting the reaction of air (or oxygen) with the asphaltic residue entering the vessel from line 80. A well known and commercial partial oxidation gasifier is marketed by Texaco Co.

The gasifier operates at a pressure of about 400 psi to about 1200 psi, typically about 500 psi to about 1000 psi, and a temperature of about 1300° C. to about 1400° C. The partial oxidation gasifier 81 converts at least 80%, preferably more than 90%, of the carbon in the gasifier hydrocarbon feed to CO. In the most preferred embodiment, the high pressure partial oxidation reaction in gasifier 81 converts substantially all of the carbon in the asphalt residue entering the gasifier to CO.

Air is pressurized (50/60 bar) in compressor 91, preheated in preheater 92 and passed to the gasifier 81 (i.e. gas generator) through line 93. The asphaltic residue enters the top of vessel 81 and mixes with air and is partially combusted to form $H_2$, CO, and a small amount of $CH_4$ (synthesis gas). Ash is removed from vessel 81 through line 94. As indicated above, oxygen can be used in the gasifier 81 instead of air. The synthesis gas from the gasifier 81 is passed through a heat recovery steam generator 82 (for generating high pressure steam) and to a water-spray scrubber 83 via a line 95. In the scrubber 83, the gaseous stream is quenched and scrubbed with recycled water to remove carbon particles or soot through line 96.

From the scrubber 83, the synthesis gas is passed through a line 97 to the well known CO shift reactor 84, where carbon monoxide is reacted with steam to produce $H_2$. Shift reactors are commercially available from several companies including Imperial Chemical, Inc., Halder Topsoe, and KTI. Since the synthesis gas entering the shift reactor 84 is CO rich, it is ideally suited for $H_2$ production:

$$CO + H_2O \rightarrow H_2 + CO_2$$

From the CO shift reactor 84, the gas steam is passed through several purification steps to remove $H_2S$, $CO_2$ and $N_2$. As illustrated in FIG. 2, the gas mixture from reactor 84 flows through line 98 to the $H_2S$ and $CO_2$ removal units 85 and 86 which consist of a multi-stage amine (e.g. DEA, or diethyl amine) scrubbing and absorber system. The first stage of the amine absorber process removes $H_2S$ and is a commercial process available from various engineering firms, such as Eickmyer and Associates, TPA. The $H_2S$ is removed in unit 85 through line 85a. Since $H_2S$ is highly toxic, it must be treated and converted to elemental sulfur for disposal/sale. Converting $H_2S$ to elemental sulfur is a well known commercial process, and design packages are available from firms such as Parsons and TPA. The present invention, in one aspect, contemplates using the $H_2S$ stream to produce sulfuric acid using a wet sulfuric acid process. Technology developed by Halder Topsoe is commercially available (Halder Topsoe's WSA Process) for producing sulfuric acid products. These products have important applications in the alkylation process in refineries, as well as applications in petrochemical and agricultural sectors. The asphaltic residues of heavy crudes contain large amounts of sulfur (about 6%) and it is thus very logical to incorporate the co-production of sulfuric acid. The sulfuric acid can be used internally in the refinery's alkylation unit to upgrade the light olefins from the FCC (Fluid Catalytic Cracking) unit to produce high octane alkylates.

The desulfurized gas steam from the $H_2S$ removal unit is then passed through the second stage of the amine absorber system 86 to remove the $CO_2$. The $CO_2$ removal unit 86 is a well proven commercial process available for example from Eickmyer and associates under trade designation Catacarb. The $CO_2$ removed can be stored and marketed, or vented to the atmosphere.

Nitrogen is separated from the stream by well known cryogenic methods. Nitrogen cryogeneric separation technology is available from Foster Wheeler. The basic separation comprises a heat exchanger unit separator vessels. At the characteristic operation pressure, the separation can be thermally sustained by the Joule-Thomson refrigerative effect. An upstream molecular sieve cleaning stage may also be used. The $N_2$ removed can be stored and marketed.

The $H_2$ rich gas leaving the $N_2$ separation stage is passed to the final $H_2$ process step via line 101. This stage is the well known pressure swing adsorption unit 88 (PSA) which separates $H_2$ from $N_2$, CO, $CO_2$, moisture, and the like; and is commercially available from several sources including U.O.P., Air Products, Air Liquid, etc. The purity of $H_2$ leaving the PSA unit is typically in excess of 95%, preferably at least 99.0%, and most preferably at least 99.9% pure.

The high purity $H_2$ is passed to the hydrotreating units through lines 102.

Hydrotreating

As mentioned above hydrogen is required in many refining operations. Such operations include hydrocracking, hydrogeneration, and hydrogen treating of the distilled products. Hydrogen treating removes sulphur as $H_2S$, removes nitrogen or oxygens compounds, and saturates olefins. These processes are referred to herein as "hydrotreating" and are applied to straight run products, feed to catalytic reforming, feeds for catalytic cracking and hydrocracking and the like. As shown in FIG. 2 the hydrogen stream is passed to four hydrotreating units 103, 104, 105 and 106 which, respectively, receive distillate products from lines 54, 55, 57 and 144.

The distillate products flowing in lines 54, 55, 57 and 144 may vary depending on the properties of the feed stream and operation of the distillation units. The following are exemplary of a distillation system for heavy crudes:

| | |
|---|---|
| line 54 | naphtha |
| line 55 | stove oil |
| line 57 | medium distillate |
| line 144, and 72 | gasoil | the hydrotreatment of these distillates is well known in the art.

The gasoil from unit 106 may be further processed through fluid catalytic cracking units (FCC). It is particularly important that the feed to the FCC units be hydrotreated to remove the contaminants described above.

The product outputs of hydrotreating units 103, 104 and 105 may be processed further or piped to storage through lines 107, 108 and 109. The product output of FCC unit 110 may be piped to storage or further processing through line 112.

Having thus described the invention by reference to certain of its preferred embodiments, it is pointed out that the embodiments described are illustrative rather than limiting in nature and that many variations and modifications are possible within the scope of the present invention. Many such variations and modifications may be considered obvious and desirable to those skilled in the art based upon a review of the foregoing description of preferred embodiments.

What is claimed:

1. A process for refining a heavy crude oil comprising the steps of
   (a) producing the heavy crude oil from a subterranean formation;
   (b) transporting the heavy crude oil to a refinery
   (c) passing a stream of the heavy crude oil through at least one distillation zone to produce at least one overhead distillate hydrocarbon stream and a heavier bottoms stream;
   (d) deasphalting he bottoms stream to produce a deasphalted oil stream, the deasphalted stream containing substantial quantities of gas, oil and an asphaltic residue stream;
   (e) partially oxidizing the asphaltic residue stream in a high pressure, high temperature gasifier to produce a synthesis gas comprising $H_2$, $H_2S$, CO, $CH_4$ and $N_2$, wherein at least 80% of the carbon in the asphaltic residues stream is converted to CO;
   (f) passing the synthesis gas through a CO-shift reactor to convert the CO therein to $H_2$ by reacting the CO with steam to produce a gas mixture effluent;
   (g) purifying the gas mixture effluent from step (f) to produce a gas stream of at least 95% pure hydrogen with at least part of the hydrogen being used to treat the deasphalted oil stream; and
   (h) using at least part of the gas stream of step (g) in a hydrotreating process.

2. The process of claim 1 wherein the distilling zones include an atmospheric distillation zone and a vacuum flash zone.

3. The process of claim 2 wherein the overhead distillate stream of step (c) has a boiling range at atmospheric pressure of below about 770° F. and the overhead stream from the vacuum flash zone has a boiling range of up to 1060° F. at the pressure of the vacuum flash zone.

4. The process of claim 1 wherein the partial oxidizing step is carried out in the gasifier at a pressure of between about 400 psi to about 1200 psi.

5. The process of claim 4 wherein the partial oxidizing step is carried out at a temperature between about 1300° C. and 1400° C.

6. The process of claim 1 wherein the partial oxidation of step (e) converts substantially all of the carbon in the asphaltic residue stream to CO.

7. The process of claim 1 wherein the partial oxidation step is carried out using air.

8. The process of claim 1 wherein the deasphalting is by solvent deasphalting.

9. The process of claim 1 wherein the purifying step comprises removing $H_2S$, $CO_2$, $N_2$ from the effluent of the CO-shift reactor.

10. The process of claim 9 and further comprising the step of processing the removed $H_2S$ to produce sulfuric acid.

11. The process of claim 1 wherein the distillation zone produces at least two overhead hydrocarbon streams.

12. The process of claim 1 wherein the heavy crude oil contains substantial amounts of sulfur.

13. The process of claim 1 wherein the purification step (g) produces $H_2$ of at least a 99.0% purity.

14. The process of claim 1 wherein the purification in step (g) produces $H_2$ of at least 99.9% purity.

15. A method of producing hydrogen at a refinery and using the hydrogen so produced in hydrotreating operations in the refinery, said method comprising the steps of
   (a) producing a heavy crude oil from a subterranean formation;
   (b) transporting the heavy crude oil to a refinery;
   (c) passing the heavy crude oil at the refinery through an atmospheric distillation zone to produce a distillate hydrocarbon overhead stream having a boiling range below about 770° F. and a heavier bottoms stream having a boiling range above about 710° F.;
   (d) passing the overhead stream through a hydrotreating unit;
   (e) passing the bottoms stream to a deasphalting unit to separate the bottoms stream into a deasphalted oil stream, the deasphalted stream containing substantial quantities of gas, oil and an asphaltic residue stream;
   (f) passing the deasphalted oil stream to a hydrotreating unit;
   (g) passing the asphaltic residue stream to a high pressure, high temperature, air partial oxidation gasifier to partially oxidize the stream into a CO-rich synthesis gas stream;
   (h) passing the synthesis gas stream through a CO shift reactor to convert CO contained therein to $H_2$;
   (i) purifying the gas stream leaving the CO shift reactor to at least 99% pure hydrogen; and
   (j) passing the purified gas stream to said hydrotreating units, wherein the hydrocarbon streams passing therethrough are hydrotreated with at least a portion of the hydrogen being used to treat the deasphalted oil stream.

16. A method of producing hydrogen at a refinery and using the hydrogen so produced in hydrotreating operations in the refinery, said method comprising the steps of
   (a) producing a heavy crude oil from a subterranean formation;
   (b) transporting the heavy crude oil to a refinery;
   (c) passing the heavy crude oil at the refinery through an atmospheric distillation zone to produce at least one distillate hydrocarbon overhead stream having a boiling range therein below about 770° F. and a heavier bottoms stream having a boiling range therein of above about 710° F.;

(d) passing the overhead stream of step (c) through a hydrotreating unit;

(e) passing the bottoms stream to a vacuum flasher to produce an overhead hydrocarbon stream having a boiling range up to about 1060° F. and a bottoms hydrocarbon stream having a boiling range above about 750° F.;

(f) passing the overhead stream of step (e) through a hydrotreating unit;

(g) passing the bottoms stream to a deasphalting unit to separate the bottoms stream into a deasphalted oil stream, the deasphalted oil stream containing substantial quantities of gas, oil and an asphaltic residue stream;

(h) passing the deasphalted oil stream to a hydrotreating unit;

(i) passing an asphaltic residue stream to a high pressure, high temperature partial oxidation gasifier to partially oxidize the stream into a synthesis gas stream containing at least 80 volume % CO;

(j) passing the synthesis gas stream through a CO shift reactor to convert at least part of the CO contained therein to $H_2$;

(k) purifying the synthesis gas stream to at least 99.0% pure hydrogen; and (l) passing the purified gas stream to said hydrotreating units, wherein the hydrocarbon streams passing therethrough are desulfurized with at least a portion of the hydrogen being used to treat the deasphalted oil stream.

17. The method of claim 9 wherein the purification step comprises the sequential removal of $H_2S$, $CO_2$ and $N_2$ from the synthesis gas stream.

18. The method of claim 16 wherein the partial oxidation step in the gasifier is carried out using pressurized, preheated air.

* * * * *